United States Patent [19]
Phillips

[11] Patent Number: 5,271,684
[45] Date of Patent: Dec. 21, 1993

[54] ROTATABLY MOUNTED CABLE FOR COMMUNICATION EQUIPMENT

[75] Inventor: Michael J. Phillips, Camp Hill, Pa.

[73] Assignee: The Whitaker Corporation, Wilmington, Del.

[21] Appl. No.: 991,690

[22] Filed: Dec. 16, 1992

[51] Int. Cl.⁵ .................. F16B 21/07; F16B 21/18; H01Q 1/20
[52] U.S. Cl. .................. 403/106; 403/164; 403/375; 343/882; 248/222.3
[58] Field of Search .................. 343/715, 882; 248/222.3; 403/106, 164, 375

[56] References Cited

U.S. PATENT DOCUMENTS

| | | | |
|---|---|---|---|
| 3,662,297 | 5/1972 | Tachick et al. | 339/60 R |
| 3,665,477 | 5/1972 | Budrow et al. | 343/882 X |
| 4,699,410 | 10/1987 | Seidel | 403/164 X |
| 4,725,238 | 2/1988 | Meyer | 439/8 |
| 4,857,014 | 8/1989 | Alf et al. | 439/578 |
| 4,982,981 | 1/1991 | Fourrey et al. | 248/222.3 X |

*Primary Examiner*—Randolph A. Reese
*Assistant Examiner*—Christopher J. Novosad
*Attorney, Agent, or Firm*—William B. Noll

[57] ABSTRACT

The preferred embodiment of this disclosure is directed to an antenna connector for a cellular telephone, where such antenna may be rotated from a first position to a second position, such as "use" and "rest" positions, where the preferred rotation extent is about 90°. The connector comprises a fixed support member and a circular housing member mounted therein for rotative movement between such first and second positions. The fixed support member is defined by first and second major faces having a circular opening extending therebetween for receiving the circular housing member, and at least one arcuate recess along the first major face adjacent said opening, where the length thereof extends between the first and second positions. The circular housing member includes a reduced diameter portion extending from one end thereof to an annular shoulder, where the reduced diameter portion is received within the circular opening up to the shoulder. Finally, a spring metal ring is provided to retain the circular housing within the fixed support, where the ring is located about the reduced diameter portion for abutting against the second major face, and the ring is further characterized as being sinusoidal in configuration and adapted to maintain axial pressure between the fixed support and the circular housing member.

5 Claims, 9 Drawing Sheets

ROTATABLY MOUNTED CABLE FOR COMMUNICATION EQUIPMENT

BACKGROUND OF THE INVENTION

This invention relates to a rotatably mounted cable connector for communication equipment. More particularly, the invention is directed to an antenna connector for a cellular telephone, where one may desire to move the antenna connector from a stored position parallel to the cellular phone, to the position of use, typically a 90° rotation.

The conventional antennas now in use are typically telescopic where the user thereof must axially pull or push the antenna to extend or return it to a non-use position. Such antennas are usually thin, tubular sheet metal members which are subject to damage or breakage, and ultimate replacement.

The present invention avoids such problems by providing a readily usable and effective antenna, and one that can be locked into the desired positions of use and non-use.

SUMMARY OF THE INVENTION

This invention relates to a rotatably mounted cable connector for communication equipment, such as an antenna connector for a cellular telephone, comprising a fixed support member and a circular housing member mounted for movement between a first position and a second position. The fixed support member, defined by first and second major faces, includes a circular opening extending therebetween for receiving the circular housing member, and at least one arcuate recess along the first major face adjacent the opening, where the length of the recess extends between the first and second positions. The circular housing member is characterized by a reduced diameter portion extending from one end thereof to an annular shoulder, where the reduced diameter portion is received within the circular opening up to the shoulder. Finally, means to retain the circular housing within the fixed support is provided, and that said means includes a continuous spring metal ring about the reduced diameter portion for abutting against the second major face. The ring is sinusoidal in configuration and is adapted to maintain axial pressure between the fixed support and the circular housing member.

DETAILED DESCRIPTION OF PREFERRED EMBODIMENT

Figure 1:
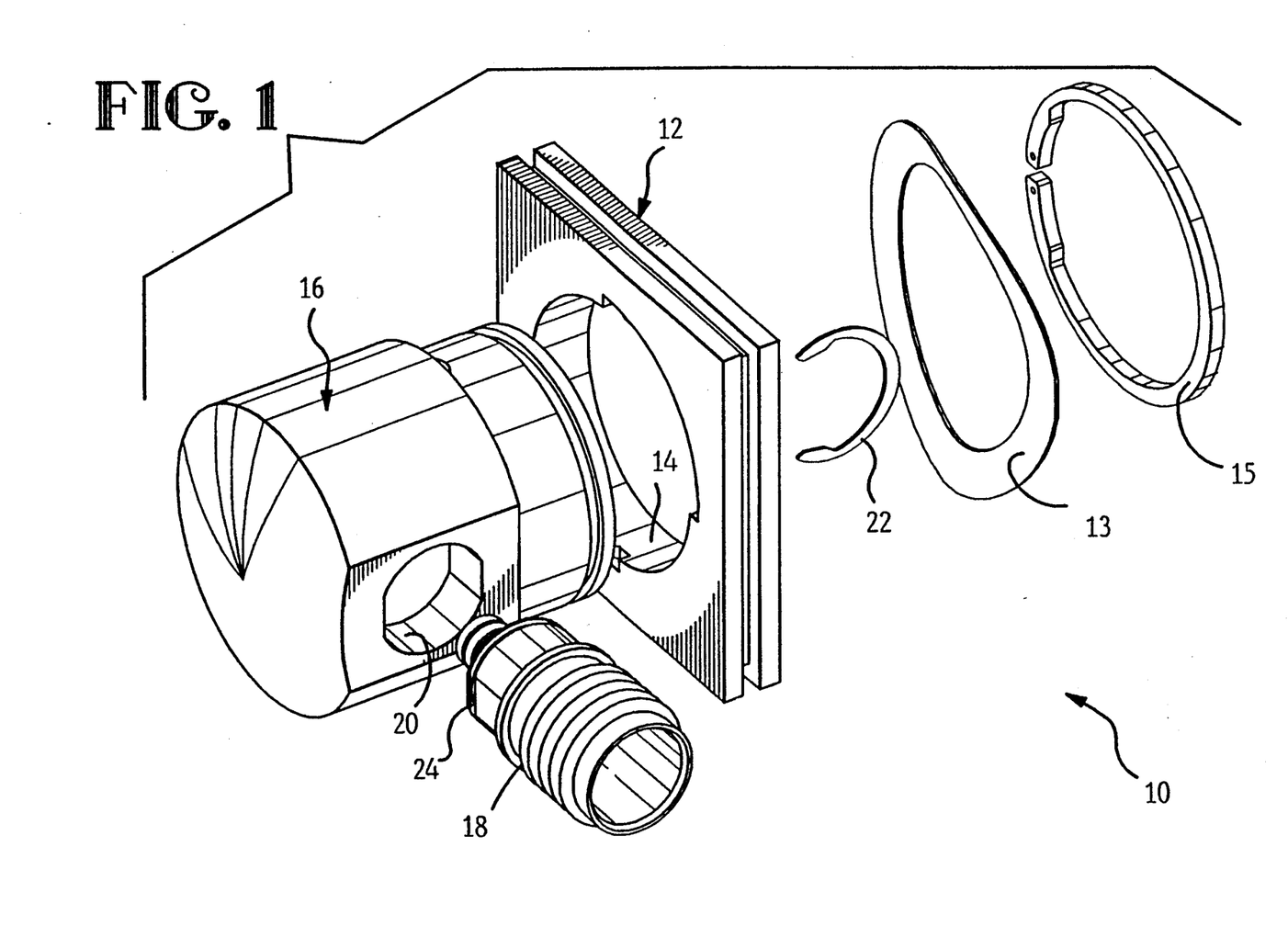
FIG. 1 is an exploded perspective view of the rotatably mounted connector, such as may be used as the antenna connector for a cellular telephone, according to this invention.
Figure 2:
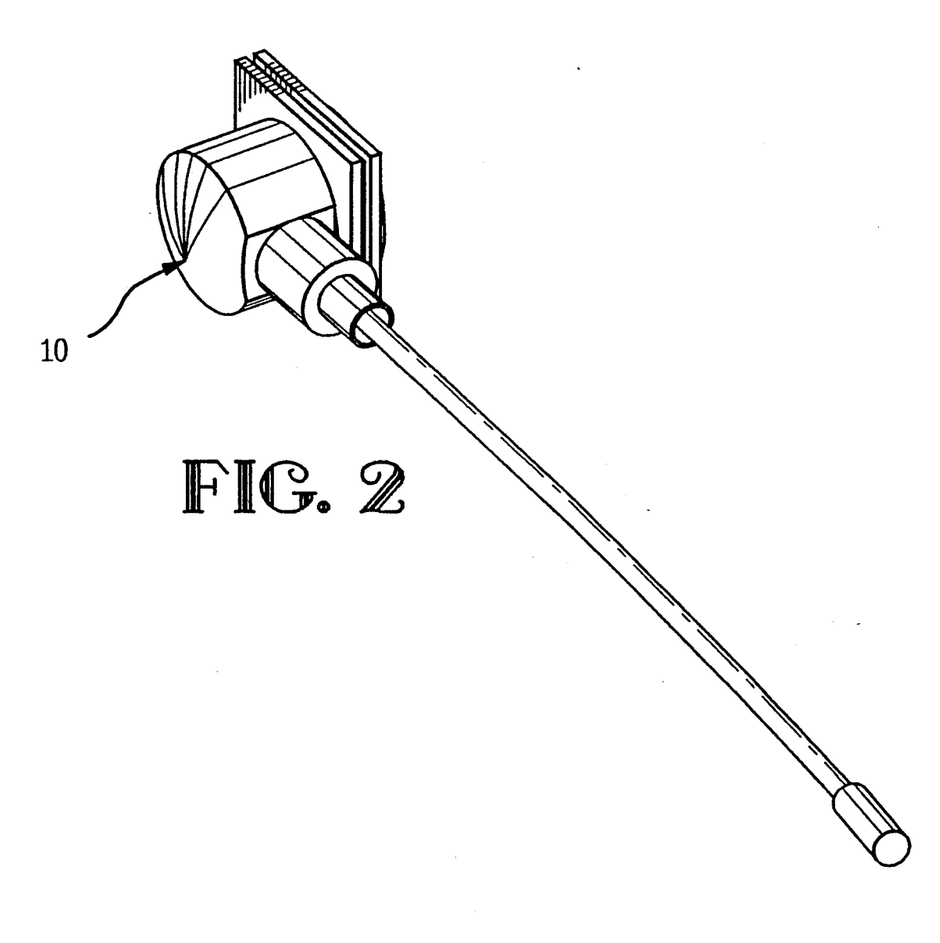
FIGS. 2 and 3 are perspective views of the assembled rotatably mounted connector of this invention, further illustrating a flexible antenna mounted thereto.
Figure 3:
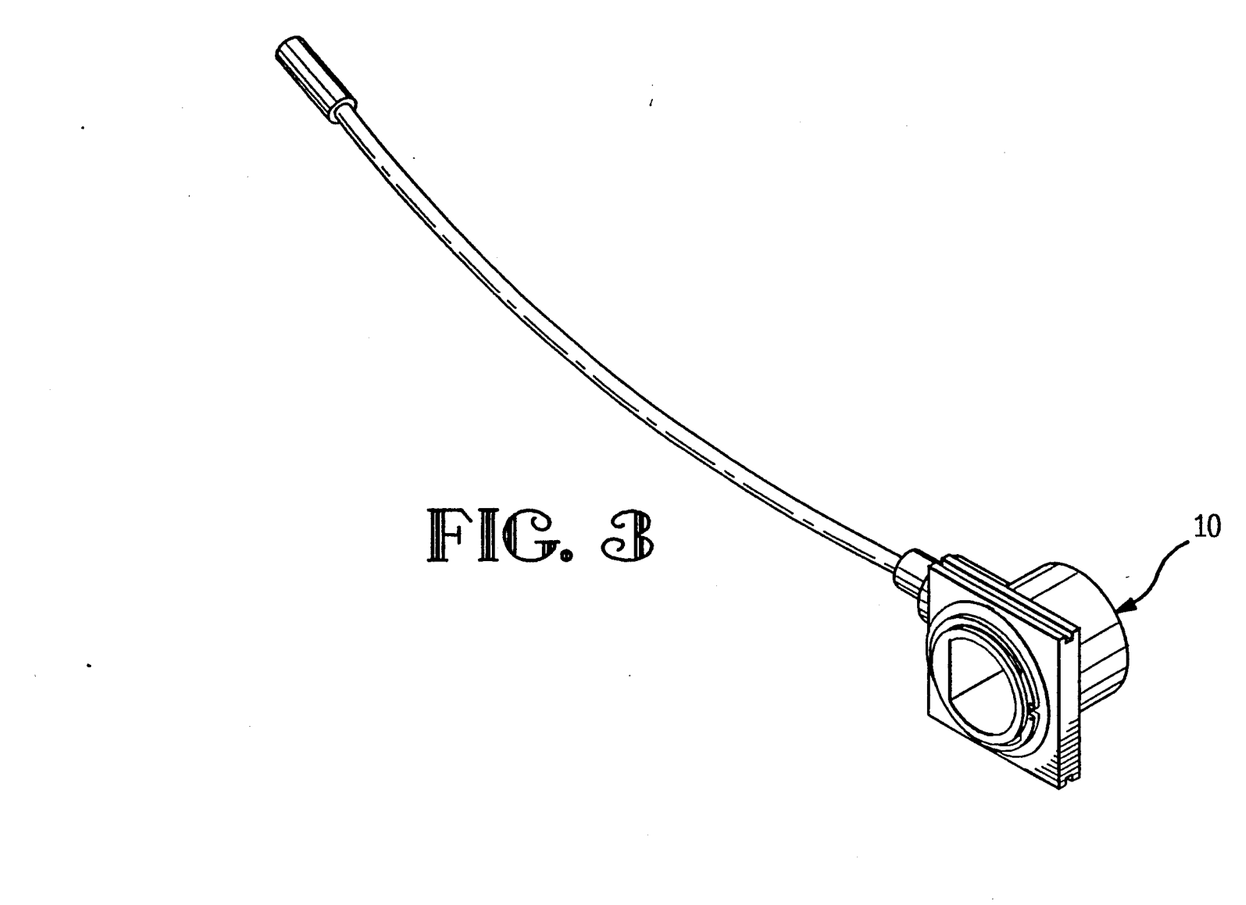

This invention is directed to a rotatably mounted cable connector, such as an antenna for mounting to communication equipment, preferably a cellular telephone. FIG. 1 shows the various components thereof in an exploded position, while FIGS. 2 and 3 show the assembled connector, with a flexible antenna secured thereto.

The major elements of the connector 10, according to this invention, comprise a fixed support member 12, having a central opening 14 for rotatably receiving circular housing 16. Additionally, the connector 10 includes a BHD mount TNC connector 18, as known in the art, to be secured within opening 20 in circular housing 16 by means of c-ring 22 seated in slot 24. In a manner to be more fully described hereinafter, the circular housing 16 is held within the central opening 14 by means of a continuous spring metal ring 13, sinusoidal in configuration, and a back-up c-shaped ring 15 to limit the relative axial movement between the fixed support member 12 and circular housing 16.

Figure 4:
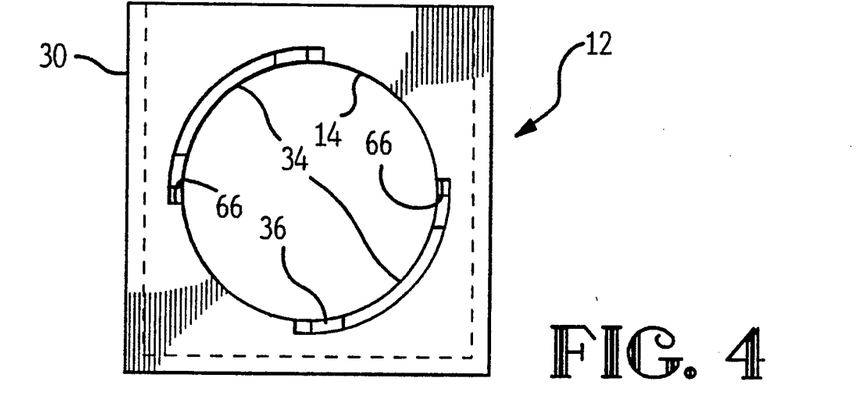
FIG. 4 is a plan view of the fixed support member for of this invention.
Figure 5:
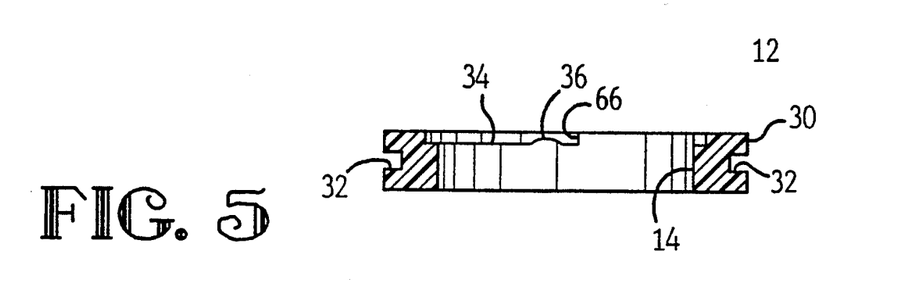
FIG. 5 is a sectional view of the fixed support member of FIG. 4.

FIGS. 4 and 5 illustrate two views of the fixed support member 12, typically molded from a dielectric material, such as plastic. The fixed support member 12 includes the central opening 14, the diameter of which is sufficient to slidably receive the circular housing 16, as hereinafter discussed. About the edge 30 of the fixed support member is a channel 32 to allow mounting of same to a cellular phone, not shown, by way of example. That is, the housing of the cellular phone may include a dimensionally appropriate slot, the walls of which are adapted to be received in the channel 32. The central opening 14 is characterized by at least one, preferably a pair of oppositely disposed arcuate recesses 34, the ends of which define the extent of relative rotation between the fixed support member 12 and circular housing 16. In the embodiment of FIG. 4, the rotation is limited to 90°, typically the two positions of "locked-rest" and "locked-in use". Adjacent each recess end are axially extending semicircular bumps 36 or projections. It will be observed later that such bumps 36 coact with corresponding projections on the circular housing 16 to signal by feel to the operator of that the extreme rotational positions have been reached.

Figure 6:
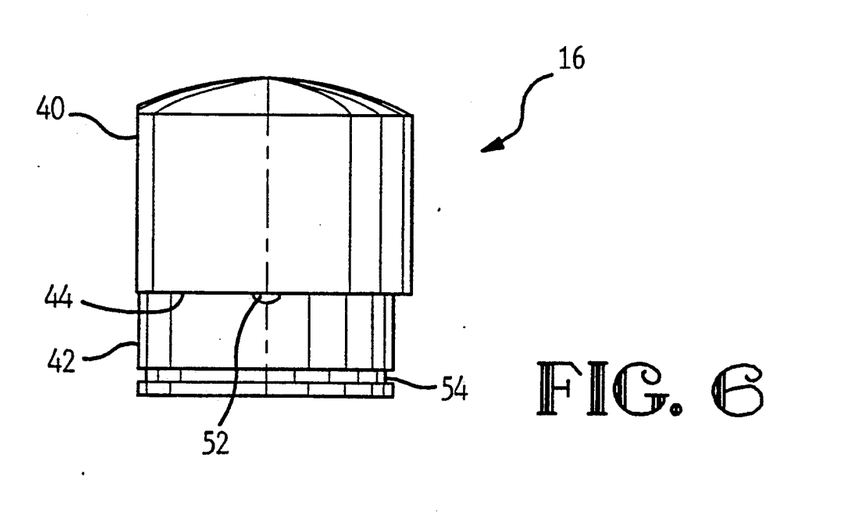
FIG. 6 is a side view of the circular housing member, to be mounted for rotatable movement within the fixed support member, according to this invention.
Figure 7:
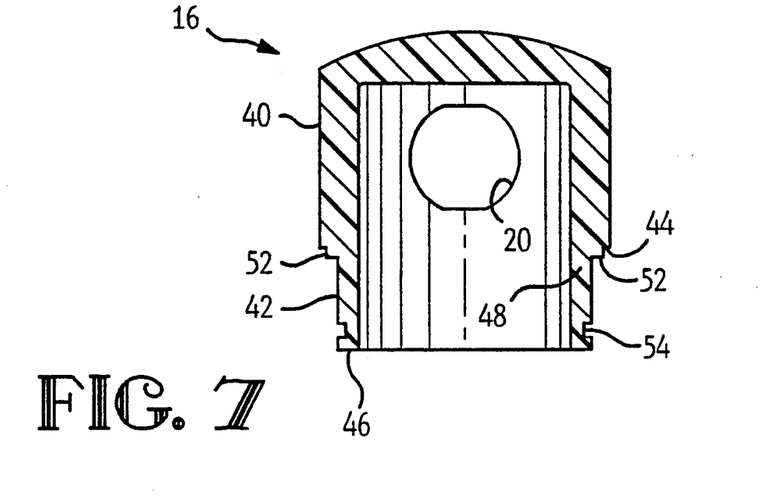
FIG. 7 is a sectional view of the circular housing member of FIG. 6.

The circular housing 16, molded from plastic, for example, is illustrated in FIGS. 6 and 7. Such housing comprises a first section 40 of a diameter which exceeds the central opening 14, and a smaller second section 42 concentric therewith, where the respective sections are separated by annular shoulder 44. Within the respective sections, opening to mating face 46, is cavity 48. Communicating with said cavity 48, through the opening 20 in first section 40, is the connector 18. Projecting axially along shoulder 44 is semi-circular bump 52 or projection which is adapted to ride along recess 34, where the number of bumps 52 is equal to the number of recesses 34. Finally, an annular channel 54 is provided about the smaller second section 42 to receive back-up c-shaped ring 15.

Figure 8:
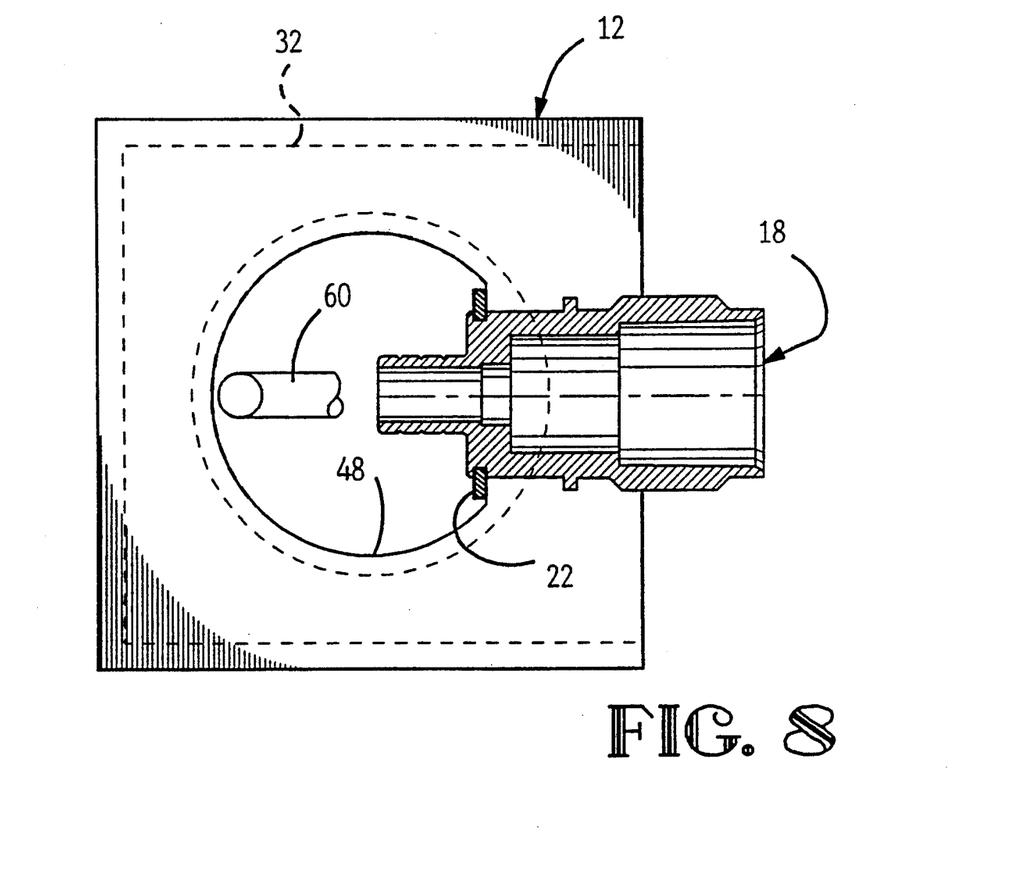
FIG. 8 is a sectional view of a TNC mounted connector within the circular housing member.
Figure 9:
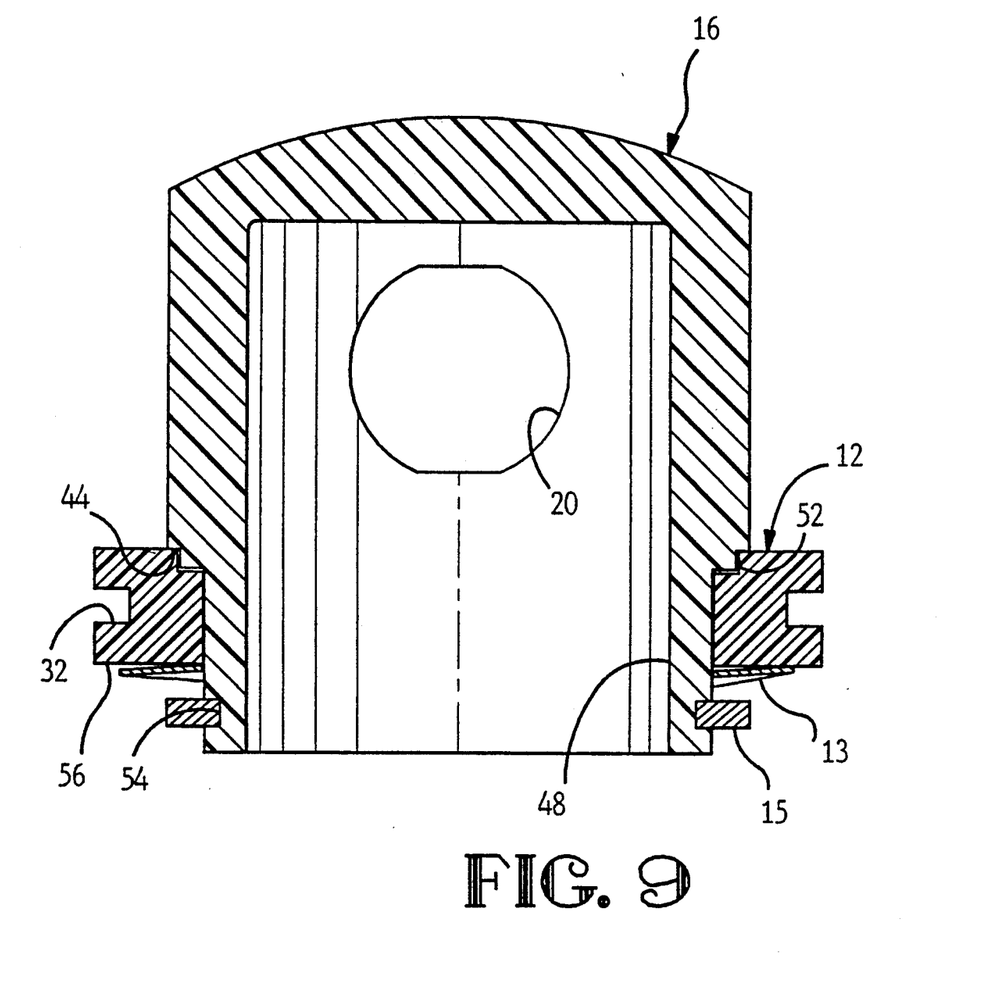
FIG. 9 is a view taken through the assembled connector of this invention.

FIG. 9 illustrates the position of mating the circular housing 16 to the fixed support member 12. In the assembly or mating thereof, the circular housing 16 is inserted into the opening 14 up to and adjacent shoulder 44. Full mating can only be achieved when the bump or bumps 52 are seated within recess or recesses 34. Thereafter, the sinusoidal ring 13 is pushed over smaller section 42 up against face 56 of fixed support member 12, followed by inserting the c-shaped ring 15 into annular channel 54 to abut the sinusoidal ring 13, thereby providing a stop to its removal from circular housing 16. Further, in the assembled embodiment of FIG. 8, the connector 18 is positioned and locked, such as by c-ring 22, for receiving cable 60 and flexible antenna 62 (see FIGS. 2 and 3).

Figure 11:
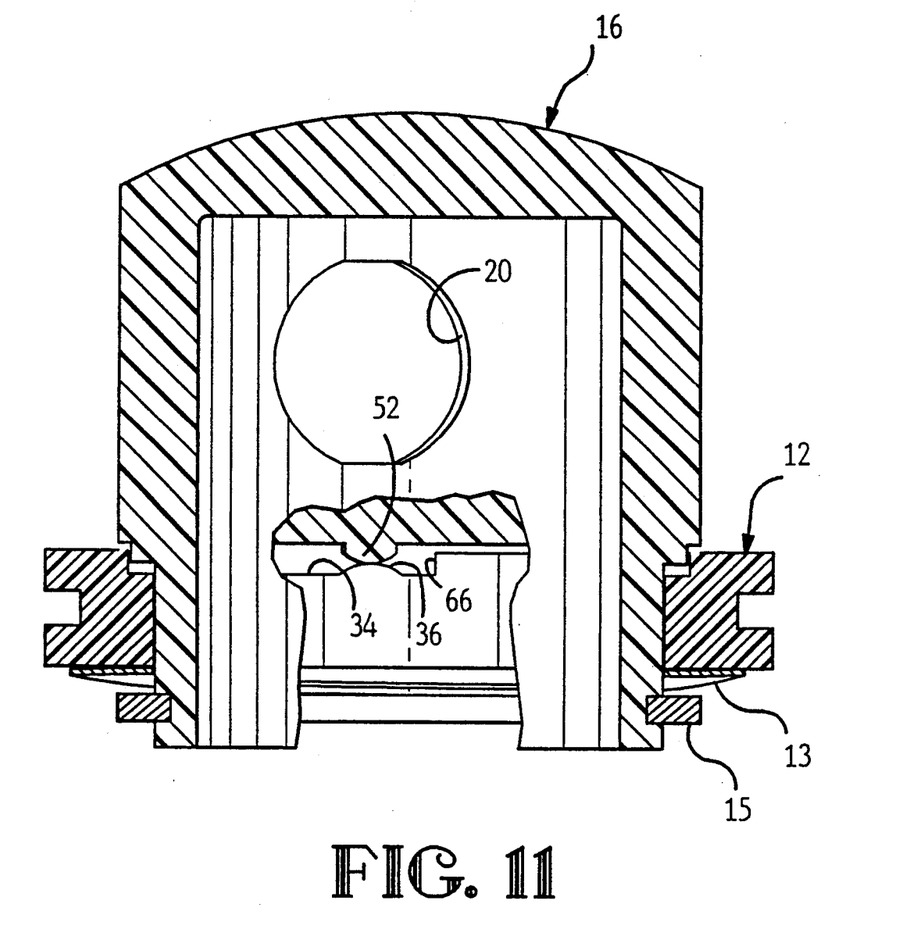
Figure 12:
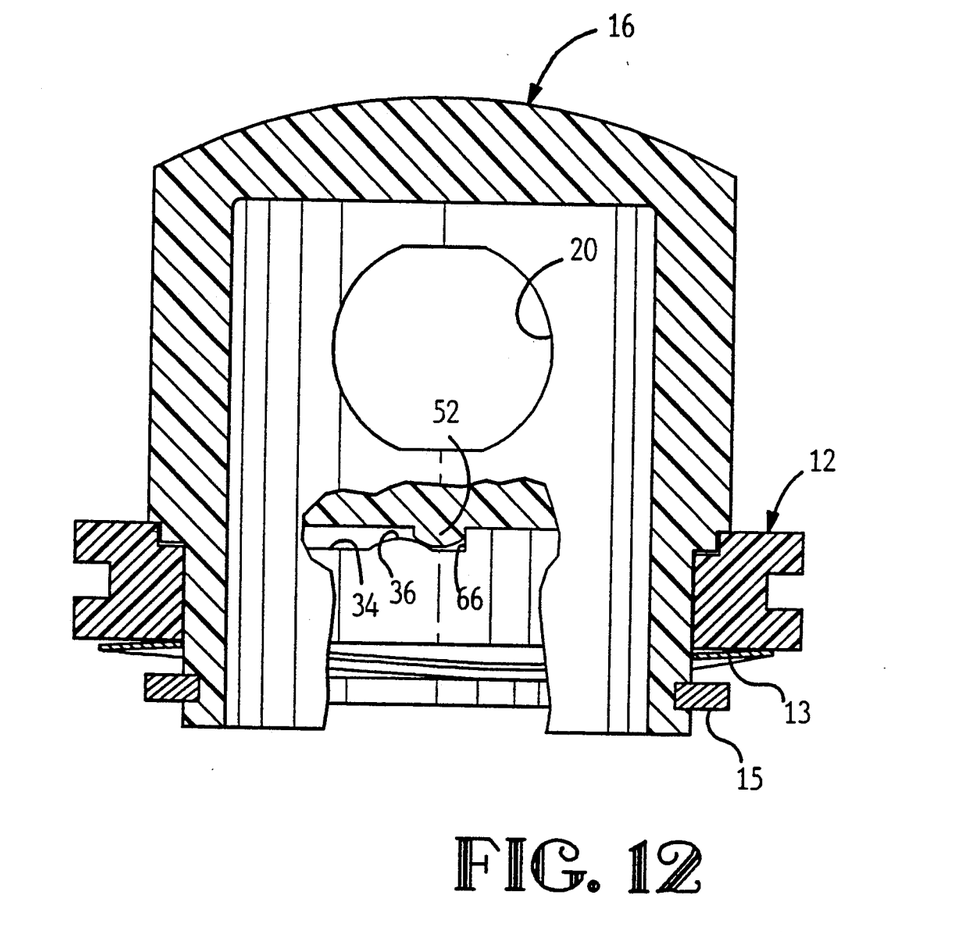

A major purpose for the invention hereof is to provide a connector that allows the user of a cellular telephone, for example, to store the antenna thereof parallel to the cellular telephone, namely, the "locked-rest" position, then rotate the antenna 90° to the "locked-in use" position. Additionally, it is desirable to be able to feel the antenna is properly positioned, and which requires some positive action to rotate the antenna from one position to another. In other words, the antenna will not move prematurely absent such positive action. To illustrate how the connector functions in the manner described above, reference is made to FIGS. 10 to 12.

Figure 10:
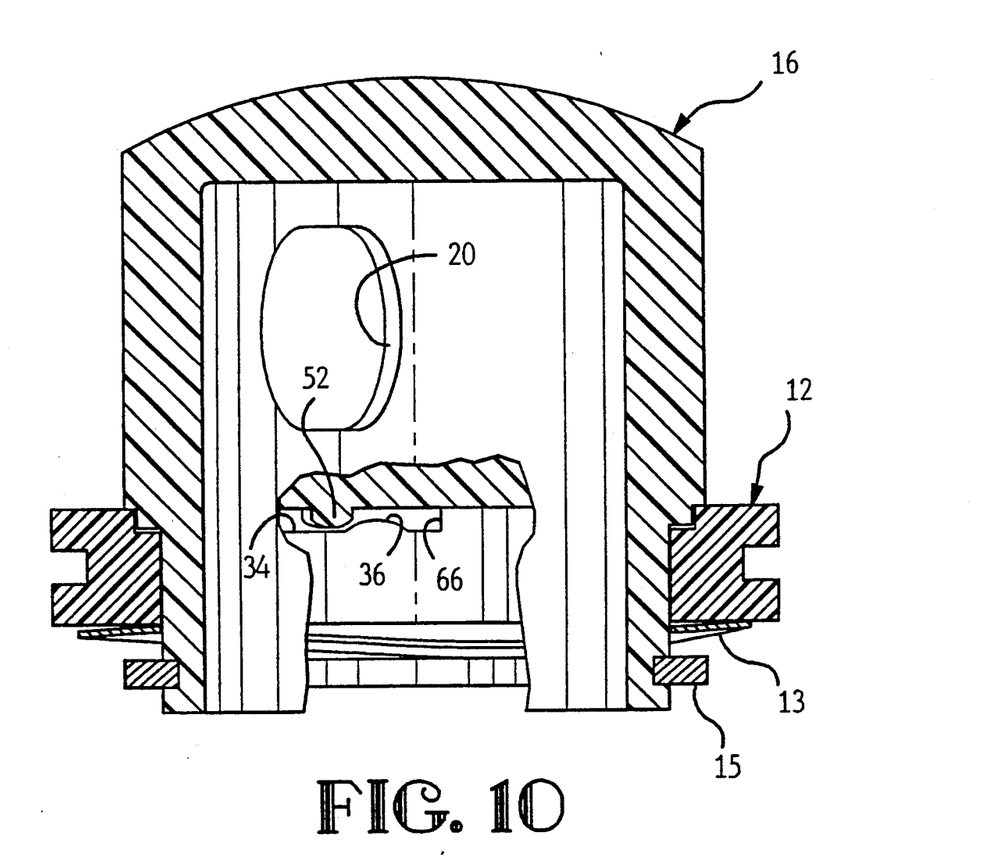
FIGS. 10-12 sectional views, with parts removed, illustrating respectively the positions of prelocking, intermediate, and locking of the assembled connector according to this invention.

FIG. 10 represents the position of rotational sliding movement, middle of the stroke, between the fixed support member 12 and circular housing 16. It will be noted that the respective components abut at shoulder 44 and that bump 52 is riding freely in recess 34. As the respective components are rotated further, such as clockwise (FIG. 11), the bumps 36,52 are brought into interference such that some positive action is required to effect the overriding of bump 52 over bump 36. With the positive action, the components 12,16 are separated slightly and sinusoidal ring 13 is compresses against c-shaped ring 15 or stop. As the respective bumps pass one another, and circular housing 16 returns to an abutting position to shoulder 44, bump 52 seats or rests between bump 36 and the end 66 of recess 34, see FIG. 12. Such a position represents, for instance, the "locked-in use" position, or the "locked-rest" position. To shift from one such position to the other, a like positive, rotative action is required to again cause the respective bumps to override one another in the opposite or counter clockwise direction. This rotative action can be effected manually, and the locked positions may be readily detected by the operator.

I claim:

1. A rotatably mounted antenna connector assembly for use on communication equipment, said assembly comprising a fixed support member and a circular housing member mounted for movement between a first position and a second position, said fixed support defined by first and second major faces having a circular opening extending therebetween for receiving said circular housing member, and at least one arcuate recess along said first major face adjacent said opening, where the length thereof extends between said first and second positions, said circular housing member having a reduced diameter portion having an annular slot thereabout, and extending from one end thereof to an annular shoulder, where said reduced diameter portion is received within said circular opening up to said shoulder, and means retaining said circular housing within said fixed support, said means including a continuous spring metal ring about said reduced diameter portion for abutting against said second major face, where said ring is sinusoidal in configuration and adapted to maintain axial pressure between said fixed support and said circular housing member, said means further including a c-ring received in said annular slot to limit the axial movement of said spring metal ring from said second major face.

2. The rotatably mounted antenna connector assembly according to claim 1, wherein said shoulder includes at least one projection therefrom, which projection is adapted to ride within a corresponding said arcuate recess.

3. The rotatably mounted antenna connector assembly according to claim 2, wherein adjacent the ends of each said recess a raised portion is provided, and that said projection coacts with said raised portion to define the respective said first and second positions.

4. The rotatably mounted antenna connector assembly according to claim 3, wherein said coaction effects an axial separation between said fixed support and said circular housing member against the resistance of said continuous spring metal ring, whereby said coaction results in a temporary locking of the fixed support and circular housing member in said first or second positions.

5. The rotatably mounted antenna connector assembly according to claim 1, wherein said circular housing member includes connector means for mounting an antenna thereto.

* * * * *